United States Patent [19]

Wolcott, Jr.

[11] 4,396,838
[45] Aug. 2, 1983

[54] LOGGING TYPE SUBSIDENCE DETECTOR

[75] Inventor: Herbert B. Wolcott, Jr., Plano, Tex.

[73] Assignee: Atlantic Richfield Company, Los Angeles, Calif.

[21] Appl. No.: 222,799

[22] Filed: Jan. 5, 1981

[51] Int. Cl.³ .............................................. G01V 5/00
[52] U.S. Cl. ..................................... 250/256; 250/260
[58] Field of Search ............... 250/253, 256, 259, 260, 250/265, 266, 269, 358 R, 360; 324/323, 333

[56] References Cited

U.S. PATENT DOCUMENTS 3,205,356  9/1965  Owen .................................. 250/266
3,869,607  3/1975  Sandier et al. ...................... 250/260

Primary Examiner—Alfred E. Smith
Assistant Examiner—Janice A. Howell
Attorney, Agent, or Firm—Robert M. Betz

[57] ABSTRACT

In order to determine subsurface subsidence, the incremental movement of a radioactive source buried in a formation of interest is monitored by means of a gamma detector carried in a sonde on a downhole cable or tubing. The sonde is lowered to the vicinity of the buried source in either a cased or uncased borehole. A reversing motor within the sonde moves the detector up and down so that it continuously and automatically scans the formation in the vicinity of the source. The data transmitted to the surface enables detection of very small changes in the elastic properties of formation rocks, thereby permitting early warning of significant subsidents.

5 Claims, 4 Drawing Figures

4,396,838

LOGGING TYPE SUBSIDENCE DETECTOR

BACKGROUND OF THE INVENTION

1. Field of the Invention

This invention relates generally to the field of formation subsidence measurements and is more particularly concerned with apparatus of this type to be used with a buried radioactive source.

2. Prior Art

When a reservoir is produced and its fluid pressure falls, some of the overburden stress is transferred to the adjacent rock matrix. This increased stress causes the rock to compact both elastically and inelastically. If compaction is great enough, this can lead to undesirable or dangerous subsidence effects. Similar problems arise as a result of the production of a coal seam.

A known technique for measuring formation subsidence employs a radioactive source such as a cesium pellet implanted, buried or fired into a formation of interest as a depth marker. Formation subsidence is then measured by detection of the radiation from such source with a downhole logging tool.

This prior art technique involves lowering a gamma detector on a cable in a borehole adjacent to the source and recording the fluctuating gamma ray intensity as the sonde logs over a prescribed distance. The logging operation may be repeated at intervals to observe if a shift occurs in the depth at which maximum signal is observed.

A shortcoming of the above method is that customarily tubing collar location is employed as a reference point for source movement. Therefore the borehole must be cased. Furthermore, if the location of the collar used as a reference has changed through subsidence, subsequent radioactive signal indications will no longer be reliable. This can prevent accurate measurement of very small plastic rock deformations, say on the order of several hundredths of an inch. Changes of this magnitude can be significant precursors of major changes.

A related disadvantage inherent in the above-described prior art technique lies in the fact that it is discontinuous. Depending upon the time intervals between successive logs it may, therefore, be ineffective as an early warning device.

A further disadvantage of prior art logging devices of the type described is that the reliability of signal measurements is degraded by cable tension oscillation and twist. In the short term, when a cable is lowered and a few logging runs are conducted, the signal readings from one scan to the next may change so as to give false indications.

It is, therefore, a general object of this invention to provide an improved logging type subsidence detector employing a radioactive source.

It is a further object of this invention to provide a logging type subsidence detector which permits early warning of major subsidence events.

Other objects and advantages of this invention will become apparent from a consideration of the detailed drawings and description to follow.

SUMMARY OF THE INVENTION

A gamma detector enclosed in a fluid tight sonde is positioned downhole adjacent a buried radioactive source. The detector is then moved up and down automatically and continuously within the sonde by means of a reversing electric motor to scan the formation. Incremental movement of the source is detected by shifts in the detector position corresponding to greatest gamma response. By continuously comparing this incremental movement from one scan to the next, one can calculate the amount of rate of change of source position. This information can in turn be used to trigger an early warning device, for example, when this rate reaches a preselected value.

DETAILED DESCRIPTION OF THE PREFERRED EMBODIMENTS

Figure 1:
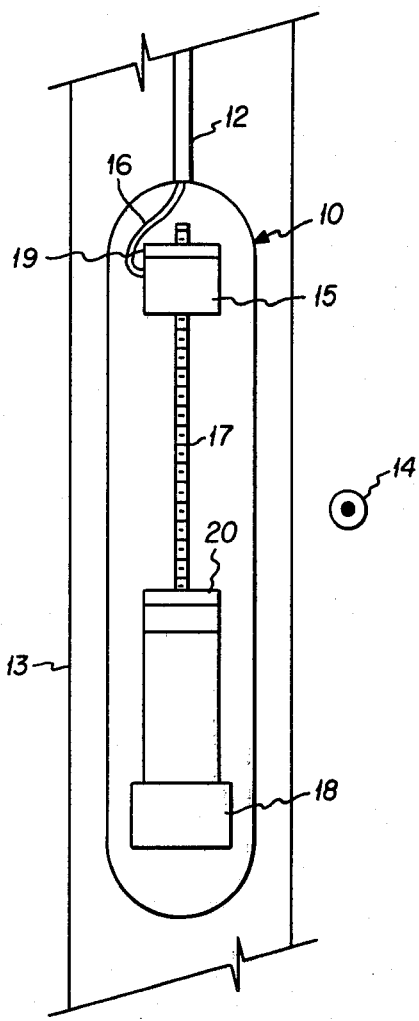
FIG. 1 is a diagrammatic view of a downhole gamma detector assembly in accordance with the preferred embodiment of this invention.
Figure 4:
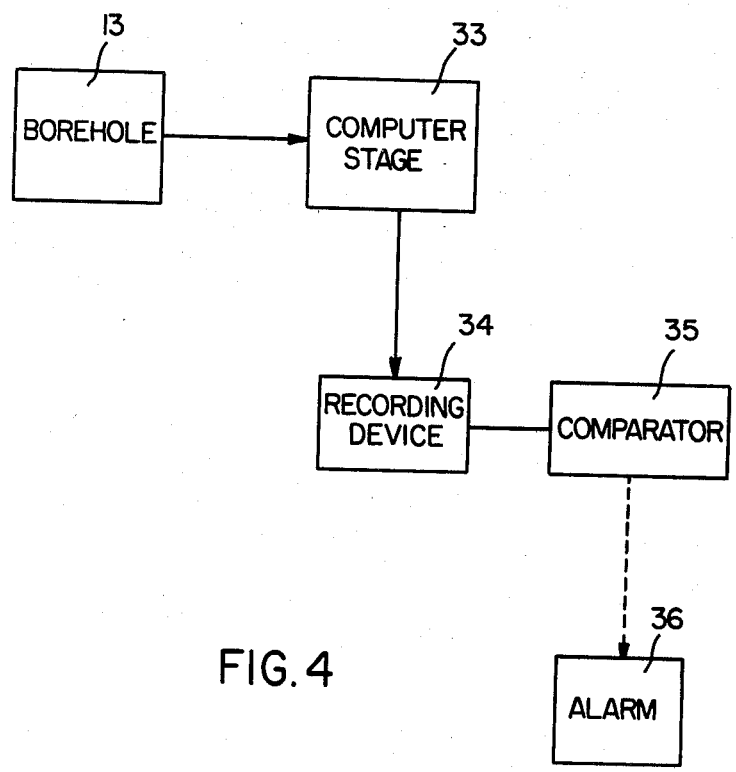
FIG. 4 is a schematic view of surface means for processing signals received from the gamma detector assembly shown in FIG. 1.

With reference now to FIG. 1, a fluid-tight pressurized logging sonde 10 is lowered from the surface on cable 12 in a borehole 13 to the vicinity of a buried radioactive source 14. Detector 15 is mounted on an advancing screw 17 driven by means of a reversing motor 18 within sonde 10. Motor reversing switches 19 and 20 are successively tripped by the travel of detector 15 so that the detector may scan continuously over the length of screw 17. Digital data representing current signals are transmitted from detector 15 to the surface through conductor cable 16. As best shown in the schematic of FIG. 4, these signals are processed by means of computer stage 33 in conventional fashion for display or continuous plot of the gamma response of detector 15 versus time on a recording device 34. The position of source 14 is established by determining a point on the gamma response curve obtained through detector 15 where the signal is a maximum. With this point as a reference, incremental movement of the source 14 can then be plotted with the aid of comparator 35 as a function of time without employing any external reference such as the position of a tubing collar. It makes no difference whether the borehole is cased or not. Both the amount and rate of change in position of source 14 can be precisely pinpointed by observing a computerized plot of incremental movement of detector 15 versus time. By noting by means of comparator 35 the point at which this relationship ceases to be linear, or the rate exceeds a predetermined value by means of comparator 35 the onset of such nonlinearity or rate value may be used to trigger any convenient visual or audible warning signal device 36 at a remote location. Since a questionable source position reference point is no longer involved, the incremental movement of source 14 can be readily determined to ±0.08 in. or better, given the precision of existing equipment.

Figure 2:
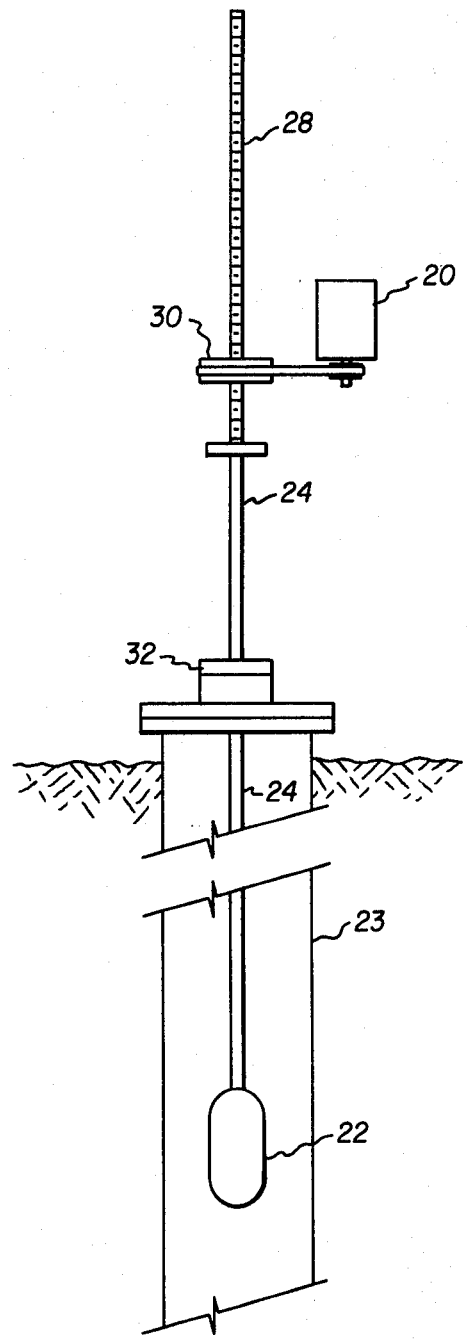
FIG. 2 is a diagrammatic view of a downhole gamma detector assembly in accordance with an alternate embodiment of this invention.

In the alternate embodiment of this invention depicted in FIG. 2, a drive motor 20 positioned above the surface is adapted to move a sonde 22 up and down within a borehole 23 by means of logging cable 24 dependently supported from polish rod 26 from which drive screw 28 extends upwardly. The position of screw 28 is used to trip motor reversing switches 30 and 32 and establish the length of scan for a gamma detector (not shown) within sonde 22. It is understood that this device is again to be operated automatically and continuously to provide results comparable to those for the device of FIG. 1.

Figure 3:
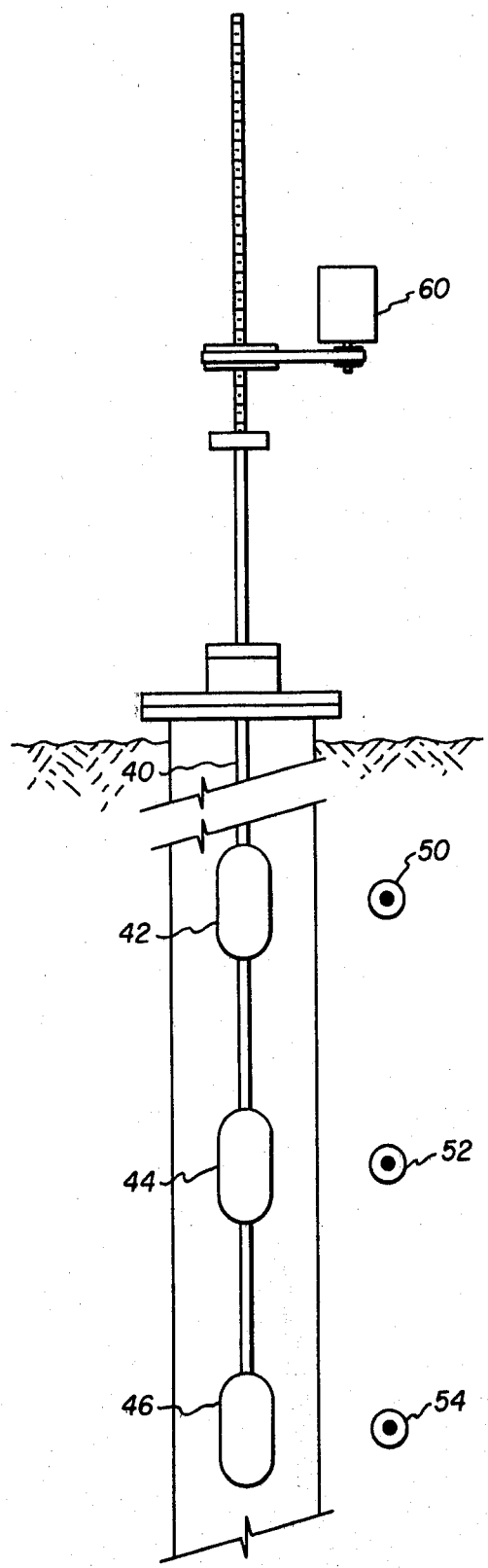
FIG. 3 is a diagrammatic view of a multiple detector assembly in accordance with a further alternate embodiment of this invention.

FIG. 3 shows a further alternate embodiment of the invention wherein a plurality of gamma detectors (not shown) are supported at predetermined intervals along logging cable 40 within sondes 42, 44 and 46 respectively adjacent radioactive sources 50, 52 and 54 situated within vertically separated formations. A surface mounted drive motor 60 is the power source for moving sondes 42, 44 and 46 continuously up and down as previously described to generate simultaneous logs of incremental movement with time for sources 50, 52 and 54.

The continuous operation of the device of this invention tends to bring the supporting cable 12 (FIG. 1) to an equilibrium condition so as to effectively neutralize the problem of cable oscillation and twist. However, the means for lowering the detector sonde in this invention need not be a cable, but may be a rigid tubing or other means for establishing a rigid connection between the sonde and the surface.

The particular embodiments of this invention set forth in the above detailed description and accompanying drawings is illustrative only. Many modifications in the configuration and arrangement of the component parts thereof will occur to those skilled in this art without departing from the scope of the invention as set forth in the appended claims.

What is claimed is:

1. A logging type subsidence detector for monitoring the movement of a radioactive source implanted in a formation comprising:
   a. a gamma detector for sensing radiation from said source;
   b. means for positioning said detector in a borehole adjacent said source;
   c. means for moving the detector up and down continuously over a prescribed distance to sense the fluctuating radiation from said source;
   d. means responsive to the fluctuating current signal generated by said detector responsive to said radiation for producing a corresponding gamma response record;
   e. means for establishing the initial depth of said source as a reference on said gamma response record where said signal is a maximum; and
   f. means for thereafter determining and recording the incremental movement of said source with time as compared to said reference.

2. A device as in claim 1 wherein said detector is driven by means of a reversing electric motor.

3. A device as in claim 1 wherein said detector is carried within a sonde lowered within said borehole, and including means for moving said detector longitudinally with respect to said sonde.

4. A system for providing early warning of formation subsidence comprising:
   a. a downhole logging sonde;
   b. a gamma detector carried within said logging sonde;
   c. means for positioning said logging sonde in a borehole in the vicinity of a buried radioactive source;
   d. means for moving said sonde up and down continuously to sense the fluctuating radiation from said source;
   e. means responsive to the current signal generated by said detector for obtaining a corresponding gamma response curve;
   f. means for determining the initial depth of said source as a point on said gamma response curve where said signal is a maximum;
   g. means for thereafter determining and recording the incremental movement of said source with time with said point as a reference; and
   h. means for providing a warning signal responsive to a predetermined increase in the rate of such incremental movement.

5. A logging type subsidence detector for monitoring the movement of a plurality of radioactive sources implanted respectively in a like plurality of vertically spaced formations comprising:
   a. a downhole logging cable;
   b. a plurality of vertically spaced gamma ray detectors carried on said logging cable so that said detectors are respectively in predetermined spaced relation to said sources;
   c. means for positioning said logging cable;
   d. means for moving said detectors up and down continuously over a predetermined scanning distance;
   e. means responsive to the resultant fluctuating signals generated by said respective detectors for obtaining a gamma response curve for each said detector;
   f. means for determining the initial depth of each of said sources as points on said respective gamma responsive curve where said signals are maximum; and
   g. means for thereafter recording the incremental movement of said sources with time with said points as references.

* * * * *